(No Model.)

J. RICHARDSON.
AXLE BOX OR BEARING FOR LOCOMOTIVES.

No. 538,181.  Patented Apr. 23, 1895.

Witnesses.  
Herbert Pilkington  
H. Robert

Inventor.  
John Richardson

UNITED STATES PATENT OFFICE.

JOHN RICHARDSON, OF WELLINGBOROUGH, ENGLAND.

AXLE BOX OR BEARING FOR LOCOMOTIVES.

SPECIFICATION forming part of Letters Patent No. 538,181, dated April 23, 1895.

Application filed November 19, 1894. Serial No. 529,329. (No model.)

*To all whom it may concern:*

Be it known that I, JOHN RICHARDSON, a subject of the Queen of Great Britain, residing at Wellingborough, in the county of Northampton, England, have invented new and useful Improvements in or Connected with Axle Boxes or Bearings Chiefly Designed for Use upon Locomotives, of which the following is a specification.

My invention has for its object to provide means for compensating for the wear which usually takes place between locomotive axle boxes or bearings and the horn blocks in which the said axle boxes or bearings slide thereby preventing the knocking and the consequent excessive wear and tear which takes place with axle boxes or bearings now in general use.

According to my invention the horn blocks are arranged with a greater width between them than the width of the axle box or bearing and the bearing surface of one block is arranged at a slight angle to that of the other block so that a wedge can be introduced between the axle box or bearing and the inclined bearing surface, which wedge can be moved from time to time in order to compensate for any wear.

To enable my invention to be fully understood I will describe the same by reference to the accompanying drawings, in which—

Figure 1:
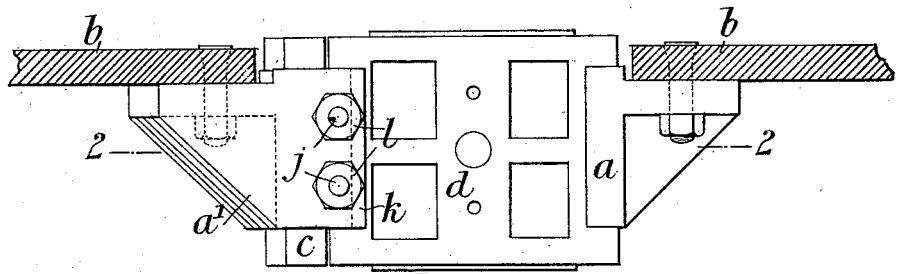
Figure 2:
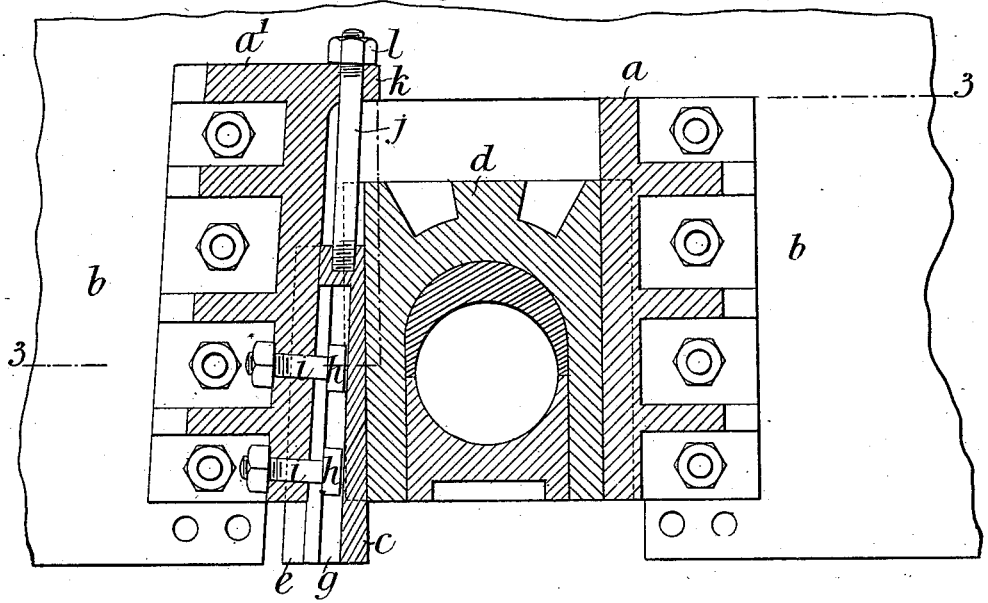
Figure 3:
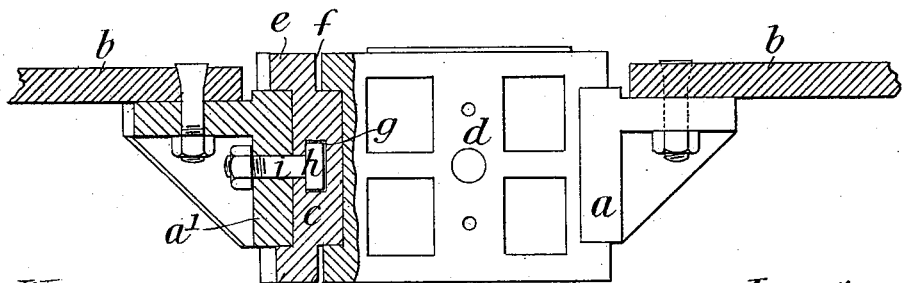

Figure 1 is a plan of a pair of horn blocks and an axle box or bearing arranged according to my invention. Fig. 2 is a section on the line 2—2, Fig. 1; and Fig. 3 is a section on the line 3—3, Fig. 2.

$a$, $a'$ are the horn blocks which are fixed to the framing $b$ of the locomotive in the ordinary manner, the horn block $a$ having a vertical face and the horn block $a'$ an inclined face.

$c$ is the wedge which I employ, the said wedge having its faces at such an angle to each other that when one face is in contact with the horn block $a'$ the other face will be parallel with the face of the horn block $a$.

$d$ is the axle box or bearing proper.

In order that the wedge shall be prevented from moving in a lateral direction relatively with the horn block $a'$, it is represented in the drawings as provided with flanges $e$, $e$ which embrace the horn block, as shown most clearly in Fig. 3, and the wearing face of the said wedge is rabbeted at $f$, $f$ in order to receive the guiding flanges of the axle box or bearing $d$.

Any suitable means may be employed for fixing the wedge $c$ in position. In practice I find it advantageous to form a T-shaped slot $g$ longitudinally in the said wedge to receive the heads $h$, $h$ of two bolts $i$, $i$ inserted in the horn block $a'$.

To permit of readily adjusting the wedge I fix in the latter screw studs $j$, $j$ which pass through a lip or flange $k$ on the horn block $a'$, nuts $l$, $l$ on the upper ends of the studs $j$, $j$ serving to adjust the latter. With this arrangement it will be readily understood that, when, owing to the wear an axle box has more or less play between its wearing surfaces, it is only necessary, after slacking the nuts on the bolts $i$, $i$ to raise the wedge $c$ by turning the nuts $l$, $l$ in order to compensate for such wear, the nuts on the bolts $i$, $i$ being then again tightened.

Having now particularly described and ascertained the nature of my said invention and in what manner the same is to be performed, I declare that what I claim is—

The combination with the horn blocks, one of said blocks having a vertical and the other an inclined face, of a wedge engaging the said inclined face having flanges for engaging the sides of the horn block, the axle box having recessed side portions for engaging said wedge and the other horn block, adjusting screws secured to said wedge and extending upwardly through portions of its adjacent horn block and a series of retaining bolts passing through a flange of said horn block and having their heads engaging a T-head slot in said wedge, substantially as described.

In witness whereof I, the said JOHN RICHARDSON, have hereunto set my hand this 26th day of October, 1894.

JOHN RICHARDSON.

Witnesses:
HERBERT PILKINGTON,
WILLIAM ROBERTS.